United States Patent
Chen et al.

(10) Patent No.: US 9,816,317 B2
(45) Date of Patent: Nov. 14, 2017

(54) SPRING-ASSISTED CORDLESS ROLLER SHADE WITHOUT CLUTCH SYSTEM

(71) Applicants: I-Ming Chen, Taipei (TW); Yao-Tsung Chen, Miaolo County (TW)

(72) Inventors: I-Ming Chen, Taipei (TW); Yao-Tsung Chen, Miaolo County (TW)

( * ) Notice: Subject to any disclaimer, the term of this patent is extended or adjusted under 35 U.S.C. 154(b) by 0 days.

(21) Appl. No.: 14/959,241

(22) Filed: Dec. 4, 2015

(65) Prior Publication Data

US 2016/0083999 A1 Mar. 24, 2016

Related U.S. Application Data

(63) Continuation-in-part of application No. 14/305,065, filed on Jun. 16, 2014, now abandoned.

(30) Foreign Application Priority Data

Apr. 17, 2014 (CN) .................... 2014 2 0188203 U

(51) Int. Cl.
| | |
|---|---|
| *E06B 9/60* | (2006.01) |
| *E06B 9/50* | (2006.01) |
| *F03G 1/02* | (2006.01) |
| *E06B 9/42* | (2006.01) |

(52) U.S. Cl.
CPC .................. *E06B 9/60* (2013.01); *E06B 9/42* (2013.01); *E06B 9/50* (2013.01); *F03G 1/02* (2013.01)

(58) Field of Classification Search
CPC .. E06B 2009/90; E06B 2009/905; E06B 9/60; E06B 9/50

USPC ...................... 160/298, 317, 318, 313, 323.1
See application file for complete search history.

(56) References Cited

U.S. PATENT DOCUMENTS

| | | | | |
|---|---|---|---|---|
| 5,934,354 | A * | 8/1999 | Price ....................... | B60R 5/047 160/313 |
| 2009/0223641 | A1* | 9/2009 | Cheng ....................... | E06B 9/42 160/318 |
| 2014/0096920 | A1* | 4/2014 | MacDonald .............. | E06B 9/50 160/291 |
| 2015/0300086 | A1* | 10/2015 | Chen ......................... | E06B 9/60 160/317 |
| 2016/0083999 | A1* | 3/2016 | Chen ......................... | E06B 9/42 160/315 |

* cited by examiner

*Primary Examiner* — Blair M Johnson
(74) *Attorney, Agent, or Firm* — Rosenberg, Klein & Lee

(57) ABSTRACT

A spring-assisted cordless roller shade without clutch system includes a tubular body defining an internal space. A shade is wound on the tubular body. The internal space has a first section and a second section. In each of the first and second sections are mounted a connector, a central shaft assembled with the connector, a fixing member connected with the central shaft and a subsidiary shaft disposed on the fixing member. An elastic member is disposed between the connector and the central shaft to provide a frictional force. A rotational member and a torsion spring are mounted on the subsidiary shaft of the first section and rotatable along with the tubular body. A constant force belt spring module is assembled with the subsidiary shaft of the second section. When the operational force applied to the shade disappears, the shade is immediately located.

5 Claims, 7 Drawing Sheets

SPRING-ASSISTED CORDLESS ROLLER SHADE WITHOUT CLUTCH SYSTEM

CROSS-REFERENCE TO RELATED APPLICATION

This application is a continuation-in-part application of U.S. patent application Ser. No. 14/305,065, filed 16 Jun. 2014, entitled "A SPRING-ASSISTED CORDLESS ROLLER SHADE WITHOUT CLUTCH SYSTEM", currently pending.

BACKGROUND OF THE INVENTION

1. Field of the Invention

The present invention relates generally to a spring-assisted cordless roller shade without clutch system, and more particularly to a roller shade including an assembly of a connector, a central shaft, a subsidiary shaft, a fixing member, a torsion spring and a constant force belt spring module for controlling rolling/unrolling of the shade and locating the shade.

2. Description of the Related Art

A conventional shade locating/controlling device is applied to a shade or the like and assembled with a rotary shaft. The shade locating/controlling device and the rotary shaft are mounted in a tubular housing. The shade locating/controlling device cooperates with a bead chain drive seat, a locking device and springs to control the rolling/unrolling of the shade. For example, a conventional skill discloses a shade locating/controlling structure. The other conventional skill discloses a shade damping structure capable of freely locating and releasing the shade in any position.

As well known by those who are skilled in this field, the bead chain system for rolling/unrolling the shade is dangerous to children. To overcome this problem, an improved bead chain structure has been developed. For example, another conventional skill discloses a cordless shade rolling/locating structure.

With respect to the structural design of the roller shade control device, the conventional device also employs a clutch mechanism to control the rolling/unrolling operation of the shade and locate the shade. In general, the assembling structure of such system is relatively complicated so that more installation steps are required and the installation time is increased. Moreover, in operation, it is harder to truly control the rolling or releasing position of the shade. Especially, with respect to a roller shade with longer rolling/releasing travel, when the rolling travel gets close to the top end portion, it often takes place that the rolling force is insufficient.

As well known by those who are skilled in this field, in the case that the roller shade necessitates a longer rolling/releasing travel, it is necessary to arrange a torsion spring with greater action force to control the roller shade in cooperation with a clutch mechanism providing a locking effect so as to overcome the activation force of the torsion spring. As a result, a user needs to apply a greater force to the shade for releasing the shade from the locking effect of the clutch. In addition, it is necessary to repeatedly pull the roller shade many times so as to adjust the roller shade to a desired position. This is not what we expect.

In conclusion, the conventional shade controlling/locating structure and the relevant assembling components thereof have some shortcomings in use and structural design that need to be overcome. It is therefore tried by the applicant to provide a spring-assisted cordless roller shade without clutch system to eliminate the shortcomings existing in the conventional shade controlling/locating structure so as to change the use form and practically widen the application range thereof. For example, in condition of easy operation and simplified structure, in comparison with the conventional shade controlling/locating structure, the spring-assisted cordless roller shade without clutch system of the present invention is free from the bead chain system of the conventional shade controlling/locating structure so that the security in operation of the roller shade is ensured. The spring-assisted cordless roller shade without clutch system of the present invention improves the shortcomings of the conventional shade controlling/locating structure that it is necessary to employ a clutch mechanism and the installation of these mechanisms is troublesome and the operation of the roller shade is laborious.

SUMMARY OF THE INVENTION

It is therefore a primary object of the present invention to provide a spring-assisted cordless roller shade without clutch system. The spring-assisted cordless roller shade includes a tubular body defining an internal space. A shade or the like is wound on the tubular body. The internal space has a first section and a second section. In each of the first and second sections are mounted a connector, a central shaft assembled with the connector, a fixing member pivotally connected with the central shaft and a subsidiary shaft disposed on the fixing member. A static frictional force is provided between the connector and the central shaft for damping the rotation of the tubular body. (As shown in the drawings, an elastic member is disposed between the connector and the central shaft. When the elastic member is compressed, two ends of the elastic member apply frictional force to the connector and the central shaft). A rotational member and a torsion spring are mounted on the subsidiary shaft of the first section and rotatable along with the tubular body. A constant force belt spring module is assembled with the subsidiary shaft of the second section. The resultant force of the torsion spring and the constant force belt spring module is equal to the gravity force of the released part of the roller shade, or the difference between the resultant force of the torsion spring and the constant force belt spring module and the gravity of the released part of the roller shade is kept within a range of the static frictional force. Accordingly, when the operational force applied to the shade disappears, the shade is immediately located. This eliminates the shortcomings of the conventional shade controlling/locating structure that it is necessary to employ a clutch mechanism and the structure is relatively complicated and it is necessary to repeatedly pull the roller shade many times so as to adjust the roller shade to a desired position.

In the above spring-assisted cordless roller shade without clutch system, the connector is assembled with a base seat and mounted at two ends of the tubular body. The base seat defines a chamber in which the central shaft is assembled. The elastic member is disposed between the chamber of the base seat and the central shaft, permitting the central shaft to axially move within the chamber to change the extent to which the central shaft pushes/compresses the elastic member and the elastic member pushes/presses the base seat and provide different frictional action forces. Correspondingly, the resistance against the rotation of the base seat is changed to adjust and control the required rolling force applied to the connector and the tubular body.

In the above spring-assisted cordless roller shade without clutch system, the constant force belt spring module of the second section includes a housing rotatable with the tubular body and a constant spring disposed in the housing. One end of the constant force spring is affixed to the subsidiary shaft of the second section, while the other end of the constant force spring is mounted on the housing. When the tubular body and the housing are rotated, the constant force spring is forced to store energy or release energy. The constant force spring can be selectively a belt reel spring or a scrolling spring.

The present invention can be best understood through the following description and accompanying drawings, wherein:

DETAILED DESCRIPTION OF THE PREFERRED EMBODIMENTS

Figure 1:
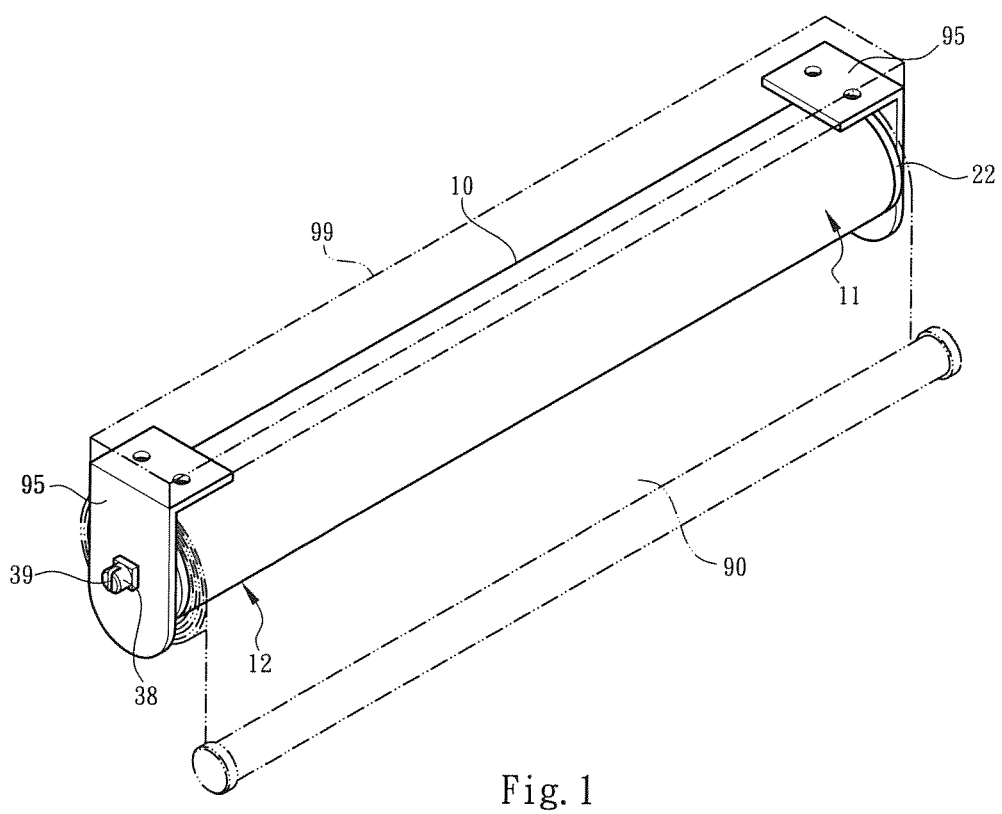
FIG. 1 is a perspective assembled view of the present invention, in which the phantom lines show that the shade or the like is assembled on the tubular body.
Figure 2:
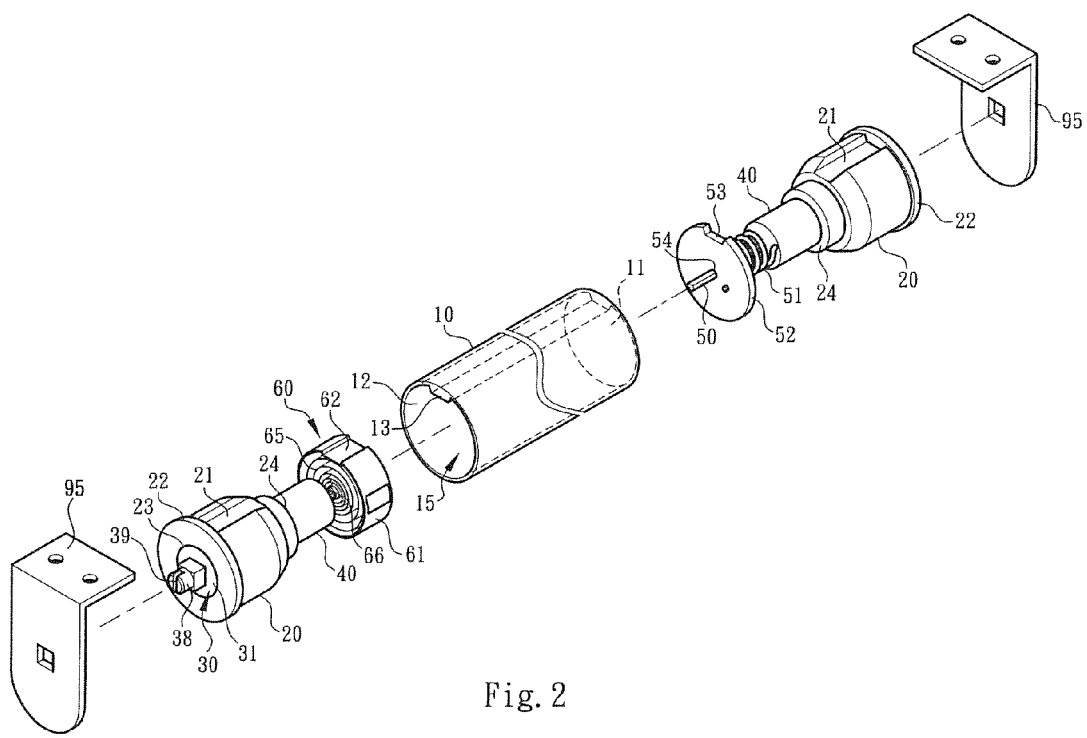
FIG. 2 is a perspective exploded view of the present invention, showing the tubular body, the connector, the fixing member, the torsion spring and the constant force belt spring module.
Figure 3:
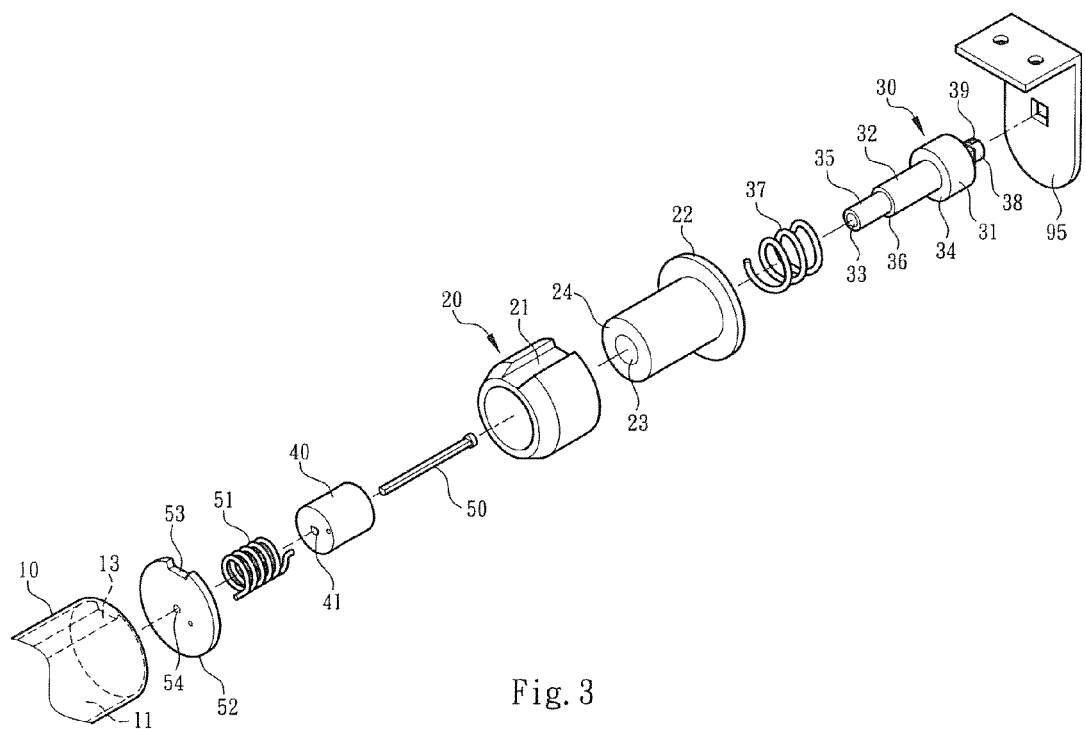
FIG. 3 is a perspective exploded view of the present invention, showing the connector, the fixing member, the torsion spring and the rotational member of the first section of the tubular body.

Please refer to FIGS. 1, 2 and 3. The spring-assisted cordless roller shade without clutch system of the present invention includes a tubular body 10 for winding a shade 90 or the like. When the shade 90 is pulled, the tubular body 10 is driven and rotated. The tubular body 10 defines an internal space 15 having a first section 11 and a second section 12. The tubular body 10 has a drive section 13 extending through the first and second sections 11, 12 in the form of an insertion block. In each of the first and second sections 11, 12 are mounted a connector 20, a central shaft 30 assembled with the connector 20, a fixing member 40 pivotally connected with the central shaft 30 and a subsidiary shaft 50 disposed on the fixing member 40.

In this embodiment, the connector 20 is a cylindrical body mounted at each end of the tubular body 10. The connector 20 is formed with a channel 21 in which the drive section 13 is inlaid, whereby the connector 20 is rotatable along with the tubular body 10. The connector 20 is securely assembled on a base seat 22, whereby when the connector 20 is rotated along with the tubular body 10, the base section 22 is driven to synchronously rotate. The base seat 22 is a tubular body defining a chamber 23 and having an extension wall 24. The central shaft 30 is mounted in the chamber 23. When an operator operates the shade, the central shaft 30 is axially moved within the chamber 23 to adjust the position of the central shaft 30. The central shaft 30 includes a head section 31 and a shaft section 32 connected with the head section 31. The central shaft 30 has a buffering room 33, whereby when the central shaft 30 is moved, the central shaft 30 will not interfere with the subsidiary shaft 50.

To speak more specifically, the width (or outer diameter) of the head section 31 is larger than the width (or outer diameter) of the shaft section 32, whereby a shoulder section 34 is formed between the head section 31 and the shaft section 32. The shaft section 32 has a free end 35 extending out of the base seat 22. A subsidiary shoulder section 36 is formed on the surface of the shaft section 32 in a position where the shaft section 32 protrudes out of the base seat 22. An elastic member 37 is disposed between the chamber 23 of the base seat 22 and the shaft section 32 of the central shaft 30. When an operator operates the central shaft 30 to axially move within the chamber 23, the shoulder section 34 of the central shaft will push and compress the elastic member 37. In this case, the elastic member 37 will exert different push/press force onto the extension wall 24 of the base seat 22 to apply a static frictional force to the base seat 22 as a resistance against relative rotation of the base seat 22 so as to control and adjust the rotation of the connector 20 and the tubular body 10.

That is, by means of adjusting the position of the central shaft 30 in the chamber 23, the push/press force applied by the elastic member 37 to the base seat 22 (or the extension wall 24) is adjustable to increase or decrease the resistance or frictional force against the rotation of the base seat 22 and the connector 20 and control the magnitude of the resistance against the rotation of the connector 20 and the tubular body 10.

Figure 4:
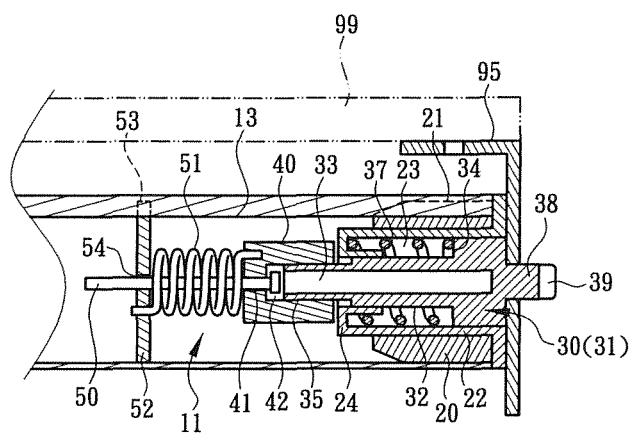
FIG. 4 is a sectional view of the present invention, showing the assembly of the first section of the tubular body.
Figure 6:
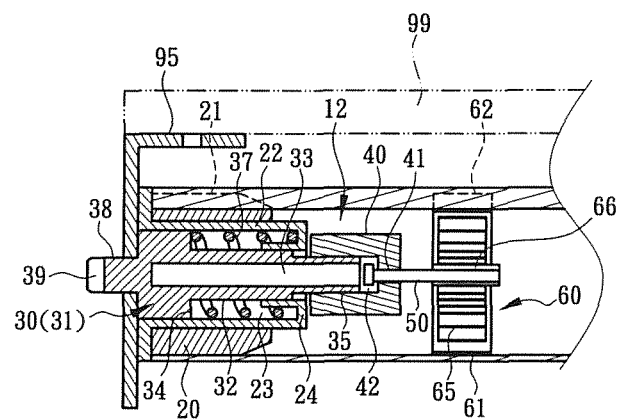
FIG. 6 is a sectional view of the present invention, showing the assembly of the second section of the tubular body.

As shown in FIGS. 2 and 3, a boss section 38 is formed on the head section 31 of the central shaft 30. A split 39 is formed on the boss section 38. A fixing plate 95 is assembled with the boss section 38, whereby the tubular body 10 and the base seat 22 can be fixedly mounted on a base face 99 (as shown in FIG. 4 or FIG. 6). The split 39 enables an operator to use a tool to rotate or push the central shaft 30 to axially move.

FIGS. 3 and 4 show the structure and assembling state in the first section 11 of the tubular body. As shown in the drawings, the elastic member 37 is selectively in the form of a compression spring disposed in the chamber 23 of the base seat 22 or wound around the shaft section 32. One end of the elastic member 37 abuts against the shoulder section 34, while the other end of the elastic member 37 abuts against the extension wall 24 of the base seat 22. The free end 35 of the shaft section 32 is securely assembled with the fixing member 40 without possibility of relative rotation. The fixing member 40 is formed with a noncircular shaft hole 41 in which the subsidiary shaft 50 is pivotally fitted without rotation relative to the fixing member 40. The fixing member 40 is formed with a cavity 42 in communication with the shaft hole 41 for receiving the free end 35 of the shaft section. In this embodiment, the subsidiary shaft 50 of the first section 11 extends out of the fixing member 40 to pivotally connect with a rotational member 52. A torsion spring 51 is wound on the subsidiary shaft 50.

To speak more specifically, the torsion spring 51 is preferably a linear spring having two ends respectively affixed to the fixing member 40 and the rotational member 52. By means of rotating the rotational member 52, the force of the torsion spring 51 is adjustable. The rotational member 52 is a structure like a rotational disc. The rotational member 52 is formed with a through hole 54 in which the subsidiary shaft 50 is pivotally fitted. The rotational member 52 is further formed with a notch 53 in which the drive section 13 of the tubular body 10 is inlaid. Accordingly, the rotational member 52 is rotatable along with the tubular body 10. The subsidiary shaft 50 and the fixing member 40 with the central shaft 30 (or the shaft section 32) are fixed on the fixing plate 95 without rotation.

Figure 5:
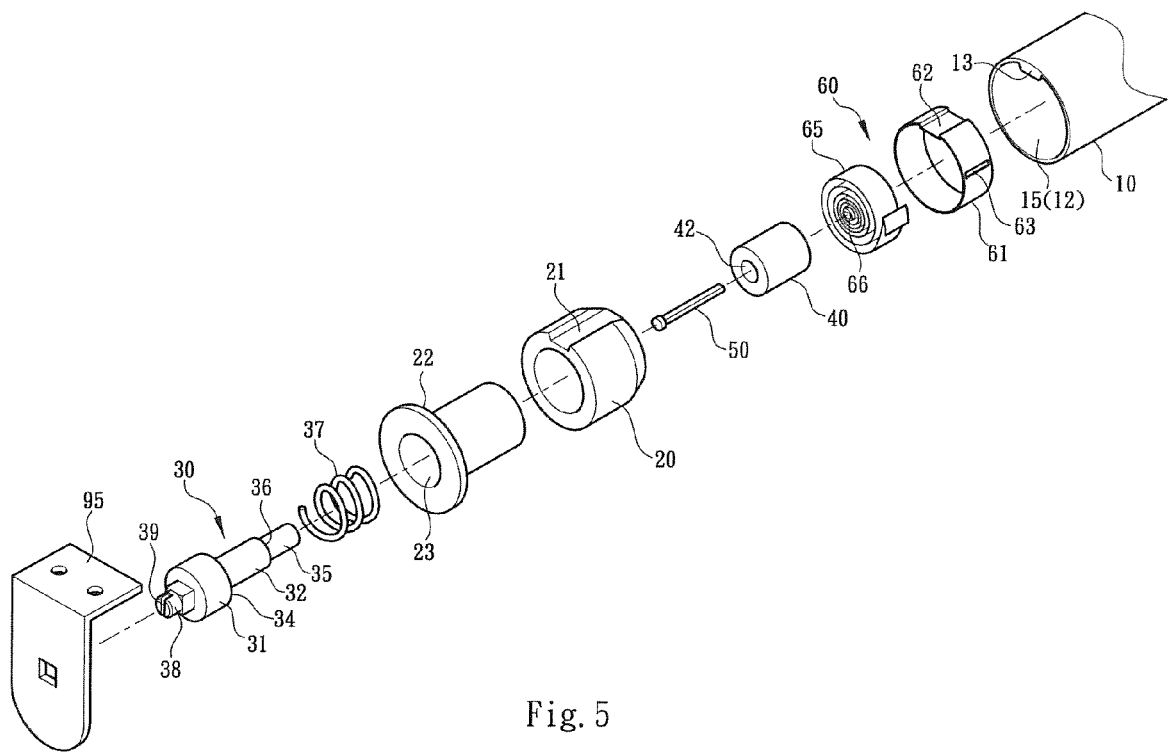
FIG. 5 is a perspective exploded view of the present invention, showing the connector, the fixing member and the constant force belt spring module of the second section of the tubular body.

Please now refer to FIGS. 5 and 6, which show the structure and assembling state in the second section 12 of the tubular body. The subsidiary shaft 50 disposed in the second section 12 of the tubular body is assembled with a constant force belt spring module 60. The constant force belt spring module 60 includes a housing 61 and a constant force spring 65 disposed in the housing 61 between the housing 61 and the subsidiary shaft 50. The housing 61 is formed with a recess 62 and a perforation 63. The drive section 13 of the tubular body 10 is inlaid in the recess 62, whereby the housing 61 is rotatable along with the tubular body 10. The constant force spring 65 is selectively a belt reel spring or scrolling spring.

As shown in the drawings, the constant force spring 65 has two ends. One end of the constant force spring 65 is affixed to the subsidiary shaft 50 via a sleeve 66 without rotation relative to the subsidiary shaft 50. The other end of the constant force spring 65 is mounted in the perforation 63 of the housing 61. Therefore, the sleeve 66 and the subsidiary shaft 50 prevent one end of the constant force spring 65 from rotating. However, the housing 61 and the other end of the constant force spring 65 are rotatable along with the tubular body 10. Accordingly, in normal state, the constant force spring 65 serves to apply a constant elastic restoring force to the tubular body 10.

Figure 7:
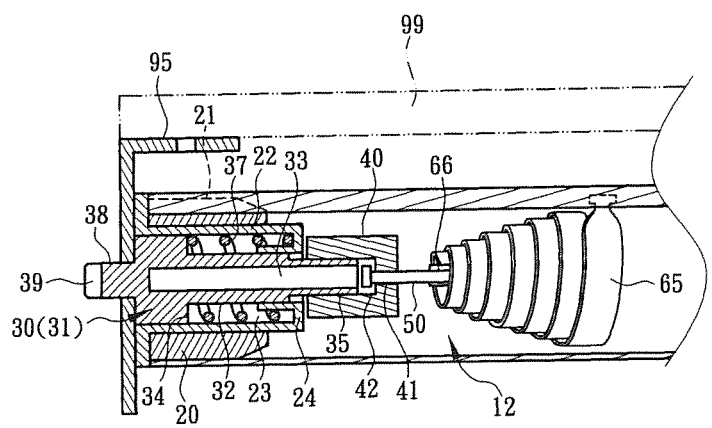
FIG. 7 is a sectional view of an embodiment of the constant force spring of the second section of the tubular body, showing that the constant force spring is a scrolling spring.

FIG. 7 shows that the constant force spring 65 is selectively a scrolling spring having two ends. One end of the constant force spring 65 is affixed to the subsidiary shaft 50 via a sleeve 66 without rotation. The other end of the constant force spring 65 is mounted on the housing 61 and rotatable along with the tubular body 10 to keep a constant elastic restoring force. In this embodiment, the constant force spring 65 is selectively a scrolling spring, which is especially suitable for mounting on a large-scale curtain or roller shade system to minify the radial size of the constant force spring 65 and avoid increase of the diameter or volume of the tubular body.

It should be noted that the force of the constant force spring 65 and the torsion spring 51 for rolling up the shade 90 is equal to the weight of the released part of the shade 90, or the difference between the force of the constant force spring 65 and the torsion spring 51 for rolling up the shade 90 and the (downward) weight of the released part of the shade 90 can be adjusted and set to be smaller than or equal to the static frictional force between the base seat 22 and the central shaft 30, for example, the static frictional force applied by the elastic member 37 to the extension wall 24 of the base seat 22 and the shoulder section 34 of the central shaft 30 as shown in the drawings. That is, the resultant force of the constant force spring 65 and the torsion spring 51 and the gravity of the shade 90 is smaller than or equal to the frictional force applied by the elastic member 37 to the base seat 22.

Accordingly, when a user pulls the shade 90 to make the tubular body 10 drive the rotational member 52 and the connector 20 of the first section 11 and the housing 61 and the connector 20 of the second section 12 to rotate, the torsion spring 51 and the constant force spring 65 are forced to change the energy stored therein. As aforesaid, the resultant force (directed upward) of the torsion spring 51 and the constant force spring 65 is equal to the weight (directed downward) of the released part of the shade 90, or the resultant force (directed upward) of the torsion spring 51 and the constant force spring 65 and the weight (directed downward) of the shade 90 is kept within a range smaller than or equal to the static frictional force. Therefore, when the pulling force of the user disappears, the shade 90 will immediately stop moving to be freely located in any position.

In the case that the user pushes back the shade 90, the torsion spring 51 and the constant force spring 65 will release the previously stored energy. Accordingly, the operational force of the user only needs to overcome the difference between the resultant force and the static frictional force to push back the shade 90. Therefore, the operational strength is saved.

In comparison with the conventional device, in condition of easy operation and simplified structure, the spring-assisted cordless roller shade without clutch system of the present invention has the following advantages:

1. The tubular body 10, the connector 20, the central shaft 30, the fixing member 40, the constant force belt spring module 60 and the relevant components (such as the connector 20 assembled with the base seat 22, the chamber 23 and the extension wall 24 of the base seat 22, the central shaft 30 mounted in the chamber 23, the head section 31, shaft section 32, the buffering room 33 and the shoulder section 34 of the central shaft 30, the elastic member 37 wound around the shaft section 32, the free end 35 assembled with the fixing member 40, the subsidiary shaft 50 pivotally connected with the rotational member 52, the torsion spring 51 or the constant force belt spring module 60) are redesigned to be different from the conventional device in use and operation form.

2. The tubular body 10, the connector 20, the central shaft 30, the fixing member 40, the constant force belt spring module 60 and the relevant components are such designed as to be different from the conventional device in which a bead chain system is used as a transmission means. The design of the present invent ion not only enhances the security in operation, but also apparently overcomes the problem of the conventional device that the installation is troublesome and the operation is laborious.

3. The torsion spring 51 and the rotational member 52 are disposed in the first section 11 of the tubular body. The constant force belt spring module 60 is disposed in the second section 12 in cooperation with the torsion spring 51 and the rotational member 52. Accordingly, the force of the torsion spring 51 and the constant force belt spring module 60 and the frictional force applied by the elastic member 37 to the base seat 22 together bear the gravity of the shade 90. This can prolong the lifetime of the torsion spring 51 and the constant force belt spring module 60. Moreover, the constant force belt spring module 60 can keep a constant elastic pull force in both the maximum unrolling travel position and the minimum unrolling travel position of the shade 90. Therefore, the torque specification of the torsion spring 51 can be properly reduced so as to effectively reduce the operational force.

In conclusion, the spring-assisted cordless roller shade without clutch system of the present invention is effective and different from the conventional device in space form. The spring-assisted cordless roller shade without clutch system of the present invention is inventive and greatly advanced and advantageous over the conventional device.

The above embodiments are only used to illustrate the present invention, not intended to limit the scope thereof.

Many modifications of the above embodiments can be made without departing from the spirit of the present invention.

What is claimed is:

1. A spring-assisted cordless roller shade without clutch system comprising:

a tubular body defining an internal space, the internal space being defined with a first section and a second section, connectors being respectively mounted in the first and second sections, the connectors being assembled with base seats, whereby the connectors and the base seats are rotatable along with the tubular body, each base seat defining a chamber, a central shaft being mounted in the chamber, the central shaft including a head section and a shaft section connected with the head section, the shaft section having a free end extending out of the base seat to securely assemble with a fixing member, the fixing member being formed with a shaft hole in which a subsidiary shaft is pivotally fixed, the subsidiary shaft of the first section protruding from the fixing member to assemble with a rotational member, the rotational member being rotatable along with the tubular body, a torsion spring being disposed between the fixing member and the rotational member of the first section, the subsidiary shaft of the second section protruding from the fixing member to assemble with a constant force belt spring module.

2. The spring-assisted cordless roller shade without clutch system as claimed in claim 1, wherein the torsion spring is a linear spring having two ends respectively affixed to the fixing member and the rotational member, the rotational member being a rotational disc structure, the rotational member being formed with a through hole in which the subsidiary shaft of the first section is pivotally connected, the rotational member being further formed with a notch in which a drive section of the tubular body is inlaid, the constant force belt spring module including a housing and a constant force spring disposed in the housing, the housing being formed with a recess and a perforation, the drive section of the tubular body being inlaid in the recess, whereby the housing is rotatable along with the tubular body, the constant force spring being a belt reel spring having two ends, one end of the constant force spring being affixed to the subsidiary shaft of the second section via a sleeve, the other end of the constant force spring being mounted in the perforation of the housing.

3. The spring-assisted cordless roller shade without clutch system as claimed in claim 1, wherein the torsion spring is a linear spring having two ends respectively affixed to the fixing member and the rotational member, the rotational member being a rotational disc structure, the rotational member being formed with a through hole in which the subsidiary shaft of the first section is pivotally connected, the rotational member being further formed with a notch in which a drive section of the tubular body is inlaid, the constant force belt spring module including a constant force spring, the constant force spring being a scrolling spring having two ends, one end of the constant force spring being affixed to the subsidiary shaft of the second section via a sleeve, the other end of the constant force spring being mounted on the tubular body.

4. The spring-assisted cordless roller shade without clutch system as claimed in claim 1, wherein a boss section is formed on the head section of the central shaft, a split being formed on the boss section, a fixing plate being assembled with the boss section, whereby the tubular body is mountable on a base face, the connector being a cylindrical body formed with a channel, the tubular body being formed with a drive section inlaid in the channel of the connector.

5. The spring-assisted cordless roller shade without clutch system as claimed in claim 1, wherein a shade is rolled and disposed on the tubular body, a resultant force of the constant force belt spring module and the torsion spring is equal to the weight of the released part of the shade.

* * * * *